March 5, 1957  F. J. TRECKER  2,784,003
MOBILE POWER UNIT
Filed Feb. 16, 1954
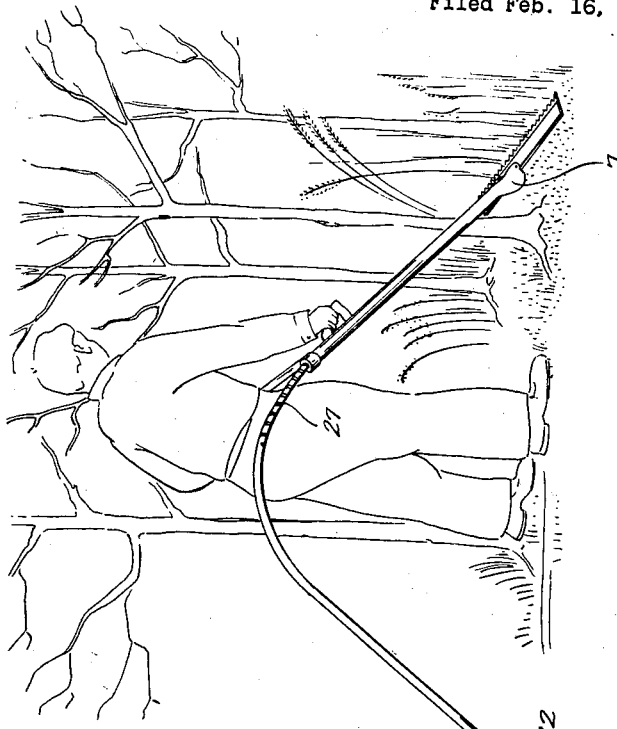
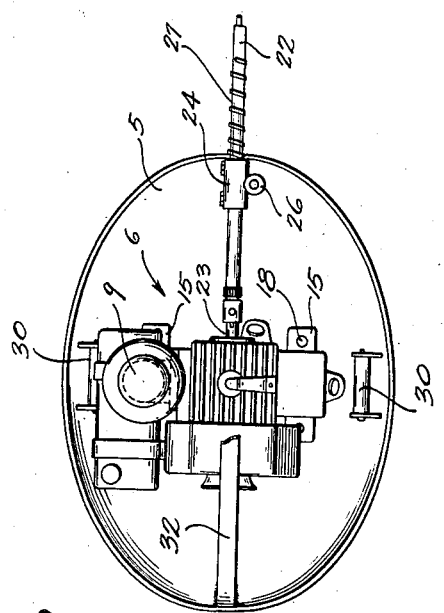
INVENTOR
Francis J. Trecker
BY
ATTORNEY

2,784,003
MOBILE POWER UNIT
Francis J. Trecker, Chenequa, Wis.
Application February 16, 1954, Serial No. 410,543
5 Claims. (Cl. 280—24)

This invention relates generally to mobile power units, and more particularly to an improved carriage especially adapted for the transportation of a portable power unit over an irregular surface, brush, or debris.

A variety of power operated appliances and implements have been devised for performing multifarious tasks. In many applications it is advantageous to provide a separate mobile unit as a source of power, and transmit the power from the unit to the appliance or implement. In some instances the implements are utilized in areas littered with brush and debris or presenting an irregular surface over which the power unit must be drawn. For example, both of these conditions exist when a power operated implement is utilized for cutting brush in a wooded area. Under such circumstances the conventional wheeled carriage for supporting the power unit has proved generally unsatisfactory, as it lacks the maneuverability required to avoid obstructions, and is generally incapable of negotiating such terrain. Furthermore, under some conditions, dirt often enters the bearings and moving parts to immobilize the carriage and necessitate the inconvenience of effecting repairs in the field.

It is therefore a general object of the present invention to provide an improved mobile power unit especially adapted for movement over rough terrain.

Another object of the present invention is to provide an improved mobile power unit which is not dependent upon wheels for its mobility.

Another object is to provide an improved mobile power unit especially adapted to be towed over terrain littered with brush and debris.

Another object is to provide an improved mobile power unit which may be turned about its vertical axis to render it extremely maneuverable.

A further object is to provide an improved mobile power unit adapted to be towed about by pulling upon a flexible shaft through which the power is transmitted.

A further object is to provide an improved mobile power unit of simple and inexpensive but sturdy construction, and efficient in operation.

According to this invention the improved mobile power unit comprises a dished plate serving as a carriage for a power unit secured to its concave face. The opposite face of the dished plate rests upon the surface over which it is to be drawn, its convex configuration rendering it especially adaptable for sliding over rough and littered terrain. In addition, for the purpose of maneuvering, the dished plate may be readily revolved about its own axis so that no turning radius is required. The power is taken from the power unit by a transmission line which transmits it to the apparatus to be actuated, with the transmission line also serving as a tow line for towing and maneuvering the motor carriage. To this end a clamping bracket is provided at the periphery of the dished plate to clamp the transmission line a short distance from its connection to the power take-off of the power unit. With this arrangement, the stresses developed in towing and maneuvering the mobile power unit will be applied to the clamping bracket rather than to the power take-off of the power unit, and the carriage may be more conveniently maneuvered by reason of the application of the turning force at the extremity of the dished plate rather than at the more central location occupied by the power take-off.

The foregoing and other objects of this invention, which will become more fully apparent from the following detailed description, may be achieved by means of the exemplifying apparatus depicted in and set forth in this specification in connection with the accompanying drawings, in which:

Figure 1 is a perspective view of a mobile power unit embodying the principles of the present invention, shown providing power for a power operated sickle bar being utilized for cutting brush in a wooded area;

Fig. 2 is a plan view of the mobile power unit illustrated in Fig. 1 with a portion of the transmission line and the sickle bar being omitted; and, Fig. 3 is a view substantially in side elevation of the apparatus depicted in Fig. 2.

Reference is now made more specifically to the drawings, and particularly to Fig. 1 thereof showing a practical embodiment of the present invention comprising a dished plate or carriage 5 serving as a mobile carrier for a conventional internal combustion engine of the reciprocating piston type generally identified in the drawings by the reference numeral 6. The engine 6 is illustrated as furnishing power for actuating a power operable sickle bar 7 being utilized for cutting brush in a wooded area. The engine 6 is of the air-cooled type which is especially adapted for portable outdoor use, having a screened cooling air intake 8 to prevent the entrance of foreign matter into the cooling system. In addition, a standard air cleaner 9 is provided for cleaning the air drawn into the combustion chamber.

Mounting bosses 14 are welded or otherwise secured to the concave face of the dished plate 5 for receiving mounting lugs 15 extending laterally from a base 16 of the engine 6. Rubber pads 17 are shown in Fig. 3, interposed between the bosses 14 and the lugs 15 to serve as a vibration dampener. The engine 6 is secured to the dished plate 5 by cap screws 18 extending through suitable holes formed in the lugs 15 and the rubber pads 17, into engagement with threaded holes provided in the bosses 14. In this manner, the engine 6 is securely fixed to the dished plate 5 to constitute a unitary structure.

Power is transmitted from the engine 6 to the implement 7 by a flexible shaft 22 connected at one end to a power take-off 23 of the engine 5, and at its other end to the sickle bar 7. In order to avoid placing undue stress upon the power take-off 23, and to render the unit more maneuverable, the flexible shaft is passed through a clamp 24 supported by a bracket 25 fixed to the concave face of the dished plate 5 in the proximity of its periphery. The clamp 24 may be selectively released or tightened to clamp the flexible shaft 22 in position by manipulating a tightening screw 26 which may be adjusted to accommodate the various sizes of flexible shafts.

In addition to serving as a transmission line, the flexible shaft 22 is intended to be used in the manner of a tow line for towing and maneuvering the power unit about. It is for this reason that the clamp 24 and its supporting bracket 25 are provided to absorb the stresses developed in towing and maneuvering the unit about, to thereby avoid placing such stresses on the power take-off 23. Furthermore, the location of the clamp 24 in the proximity of the periphery of the dished plate 5 provides additional leverage to facilitate turning the unit by a tug upon the flexible shaft 24, rather than applying such force to the more central location of the power take-off 23. A reinforcing metal ribbon 27 is wrapped about the flexible shaft in the vicinity of the clamp 24, and at its end connected to the sickle bar 7 to minimize the possibility of kinking the shaft at the points most susceptible to this sort of damage.

The dished plate 5 is designed for sliding movement along the surface upon which it rests, but there are occasions when it may be necessary to carry the entire unit from one place to another. To facilitate such handling, two handles 30 are fixed to the dished plate 5 proximate to its periphery in diametrically opposed relationship so that the unit may be readily grasped and carried by two persons. It may also be carried by one person grasping a centrally located handle 31 formed in a strap 32. The latter extends across the long diameter of the dished plate 5, being fixed to its concave surface near its periphery by an inwardly extending end 33. The other end of the strap 32 is similarly secured to the clamp 24 by an inwardly extending end 34. The power unit 6 is located on the concave face of the dished plate 5 with its center of gravity coinciding substantially with the axis of the dished plate 5 to place the assembly in balance and render it easy to carry by means of the handles 30, or the handle 31.

The stability of the mobile power unit is readily apparent, and is illustrated in Fig. 1 where it is shown passing over a length of deadwood 35. The assembly is shown in solid lines initially striking the deadwood 35. The tapered surface of the dished plate 5 offers a minimum of resistance to passage over the deadwood 35, and negotiates the obstruction with a minimum of rocking movement. The mobile power unit is depicted in phantom in Fig. 1, after it has partially passed over the obstruction, and it will be noted that it has assumed substantially its normal upright position. It is obvious that by reason of the configuration of the dished plate 5, it is virtually impossible to overturn the unit in normal use, even though relatively large obstructions may be negotiated in traversing the surface upon which it rests. The dished plate also places a minimum area in contact with the surface to be traversed to reduce the frictional resistance to sliding movement to a minimum.

In the drawings, the power unit has been illustrated as a practical embodiment in the form of an internal combustion engine of the air-cooled type. It is to be understood, that other types of power units may be mounted on the dished plate 5 without departing from the spirit and scope of the invention. For example, a motor generator set could be carried by the dished plate 5 and an electrical conductor substituted for the flexible shaft 22. Such conductor could carry electrical current from the generator to an electrical motor built into the implement 7 for actuating it. Similarly, the dished plate 5 could be arranged to carry a hydraulic pump or air compressor driven by the engine 6, and a flexible conduit substituted for the flexible shaft 22 to carry hydraulic or pneumatic pressure to an apparatus adapted to utilize it. Likewise, the dished plate 5 has been shown as elliptical in configuration, as a practical shape to reduce its width for passage through limited spaces. However, it could be readily formed in a circular shape without detracting from its basic function.

From the foregoing description of illustrative apparatus constituting an exemplifying embodiment of the present invention, it will be apparent that there has been provided an improved mobile power unit especially adapted for movement over rough or littered terrain, or in an area where extreme maneuverability is essential.

Although the illustrative embodiment of the invention herein set forth has been described in detail to make a full disclosure of the invention, it is to be understood that the particular apparatus described is intended to be illustrative only, and that the various features of the invention may be incorporated in other forms without departing from the spirit and scope of the invention as defined in the subjoined claims.

The principles of the invention having now been fully explained in connection with the exemplifying apparatus herein set forth, I hereby claim as my invention:

1. In a mobile power unit, a dished plate, a mounting surface formed on the concave face of said plate, a power unit secured to said mounting surface and having a power take-off, a flexible shaft connected to said power take-off for transmitting the power from said power unit, and a clamp fixed to said plate proximate to its periphery to clamp said flexible shaft at a point slightly removed from its connection to said power take-off, whereby said power unit may be slid along the surface to be traversed by pulling upon said flexible shaft, and the stresses developed in towing it will be placed upon said clamp rather than upon the power take-off.

2. In a mobile power unit, a dished plate, a power unit secured to the concave face of said plate with its center of gravity approximately coincident with the center of the plate, said power unit having a power take-off, a plurality of handles attached to said dished plate in the proximity of its periphery, a flexible shaft connected to said power take-off for transmitting the power from said power unit, and a clamp fixed to said dished plate in the vicinity of its periphery to clamp said flexible shaft a short distance from its connection to said power take-off, whereby said power unit may be slid along the surface to be traversed by pulling upon said flexible shaft, or the unit may be carried by grasping said handles.

3. In a mobile power unit, a dished plate, a power unit mounted on the concave surface of said dished plate and having a power take-off, a strap extending across the diameter of said dished plate and secured thereto, a handle formed on said strap, a flexible shaft connected to said power take-off for transmitting the power from said power unit, and a clamp fixed to said dished plate in the vicinity of its periphery to clamp said flexible shaft a short distance from its connection to said power take-off, whereby said power unit may be slid along the surface to be traversed by pulling upon said flexible shaft, or the unit may be carried by grasping said handle.

4. In a mobile power unit, a dished plate, a power unit secured to the concave face of said plate and having a power take-off, a flexible shaft connected to said power take-off for transmitting the power from said power unit, and a clamp fixed to said dished plate in the vicinity of its periphery to clamp said flexible shaft a short distance from its connection to said power take-off, whereby said power unit may be moved about by sliding the dished plate along the surface to be traversed by pulling said flexible shaft to use it as a tow line, and the stresses developed in towing the unit will be absorbed by said clamp.

5. In a mobile power assembly comprising, a dished plate, a power unit secured to the concave face of said plate and having a power take-off, a flexible shaft connected to said power take-off for transmitting the power from said unit, and a clamp fixed to said power assembly and relative to said power take-off and operably connected to clamp the flexible shaft adjacent its connection to the power take-off toward the periphery of the plate, whereby said power unit may be moved about by sliding said dished plate along the surface to be traversed by imparting a pull on said flexible shaft as a tow line, and the stresses developed in towing the unit will be absorbed by said clamp.

References Cited in the file of this patent

UNITED STATES PATENTS

| | | |
|---|---|---|
| 1,712,703 | Hudson | May 14, 1929 |
| 1,721,459 | McClatchie | July 16, 1929 |
| 2,062,520 | Mall | Dec. 1, 1936 |
| 2,219,905 | Prickman | Oct. 29, 1940 |
| 2,464,341 | Ostlund | Mar. 15, 1949 |
| 2,493,315 | Ruka | Jan. 3, 1950 |
| 2,597,774 | Britten | May 20, 1952 |
| 2,627,936 | Martinet | Feb. 10, 1953 |

FOREIGN PATENTS

| | | |
|---|---|---|
| 742,828 | France | Jan. 4, 1933 |